United States Patent [19]

Nagata et al.

[11] Patent Number: 4,946,923

[45] Date of Patent: Aug. 7, 1990

[54] S-ALKYL THIOCARBAMATE BASE RESIN, PLASTIC LENS COMPRISING THE RESIN, AND PROCESS FOR MAKING THE LENS

[75] Inventors: Teruyuki Nagata; Koju Okazaki, both of Fukuoka; Nobuyuki Kajimoto, Kanagawa; Tohru Miura, Kanagawa; Yoshinobu Kanemura, Kanagawa; Katsuyoshi Sasagawa, Kanagawa, all of Japan

[73] Assignee: Mitsui Toatsu Chemicals, Inc., Tokyo, Japan

[21] Appl. No.: 310,618

[22] Filed: Feb. 15, 1989

[30] Foreign Application Priority Data

Feb. 18, 1988 [JP] Japan ............................... 63-033873
Feb. 19, 1988 [JP] Japan ............................... 63-035119
Feb. 22, 1988 [JP] Japan ............................... 63-037516
Feb. 22, 1988 [JP] Japan ............................... 63-037526

[51] Int. Cl.$^5$ ............................................. C08G 75/00
[52] U.S. Cl. ..................................... 528/76; 264/1.1; 264/1.6; 350/321; 350/410; 528/77; 528/81; 528/84; 528/85
[58] Field of Search ............... 528/52, 48, 51, 76, 528/77, 81, 85; 350/321, 410; 264/1.1, 1.6

[56] References Cited

U.S. PATENT DOCUMENTS

| | | | |
|---|---|---|---|
| 4,680,369 | 7/1987 | Kajimoto et al. | 528/85 |
| 4,689,387 | 8/1987 | Kajimoto et al. | 528/85 |
| 4,775,733 | 10/1988 | Kanemura et al. | 528/81 |
| 4,780,522 | 10/1988 | Kajimoto et al. | 528/85 |
| 4,820,789 | 4/1989 | Gonzalez et al. | 528/77 |

FOREIGN PATENT DOCUMENTS

| | | |
|---|---|---|
| 0296502 | 12/1988 | European Pat. Off. . |
| 60-217229 | 10/1985 | Japan . |
| 62-236818 | 10/1987 | Japan . |
| 62-267316 | 11/1987 | Japan . |

Primary Examiner—Veronica P. Hoke
Attorney, Agent, or Firm—Burns, Doane, Swecker & Mathis

[57] ABSTRACT

Disclosed herein are a novel and highly refractive S-alkyl thiocarbamate base resin useful in preparing lenses and a process for producing the resin comprising reacting one or more of polyisocyanate compounds and one or more of mercapto compound having at least one hydroxyl group, a plastic lens made of the resin, and a process for making a plastic lens of high profile regularity from the resin by using internal mold releasing agents in the casting polymerization process.

24 Claims, No Drawings

S-ALKYL THIOCARBAMATE BASE RESIN, PLASTIC LENS COMPRISING THE RESIN, AND PROCESS FOR MAKING THE LENS

BACKGROUND OF THE INVENTION

1. Field of the Invention:

The present invention relates to an S-alkyl thiocarbamate base resin useful for making lenses, and a process for producing an S-alkyl thiocarbamate base resin. The invention also relates to a plastic lens comprising the resin, and a process for making the lens.

Plastic lenses are lightweight, less fragile and easier to dye than inorganic lenses, and thus have been widely used in recent years as optical elements such as eyeglass lenses and camera lenses.

2. Description of the Prior Art

A resin currently widely used for producing optical elements is formed by subjecting diethylene glycol bis-(allylocarbonate) (hereinafter referred to as DAC) to radical polymerization. This resin has excellent impact resistance, is lightweight, easy to dye and exhibits superb processability, and machinability including cutting and polishing ability.

However, the resin has a lower refractive index ($n_D = 1.50$) than inorganic lenses ($n_D = 1.52$). In order to obtain equivalent optical properties to glass lenses, the center thickness, peripheral thickness and curvature of a lens made of the resin must be increased and thus the lens becomes very thick. Accordingly, there has been an urgent need to develop resins useful for making lenses that have higher refractive indices.

Resins having higher refractive indices that have been used to produce plastic lenses include a polyurethane resin obtained by reacting isocyanate compounds with hydroxyl compounds such as diethylene glycol (Japanese Patent Laid-Open No. 136601/1982 (USP 4443588)), with halogen containing hydroxyl compounds such as tetrabromobisphenol-A (Japanese Patent Laid-Open No. 164615/1983), with sulfur containing hydroxyl compounds (Japanese Patent Laid-Open Nos. 194401/1985 and 217229/ 1985 (USP 4680369, USP 4780522)), or with polythiol compounds (Japanese Patent Laid-Open Nos. 199016/1985 (USP 4689387) and 267316/1987).

Although lenses made of these prior art resins have improved refractive indices over lenses made of DAC, their refractive indices are still insufficient. Moreover, these lenses exhibit high dispersion of refractive index, poor weatherability, or large specific gravity, due to the presence of several halogen atoms or aromatic rings for the purpose of improving the refractive index of the resulting lens.

Casting polymerization is generally used to produce plastic lenses prepared from DAC, PMMA, and polycarbonates. In the preparation of such lenses, it is known to add butyl phosphate to DAC as an internal mold releasing agent to improve the mold releasing property. In general, however, internal molding agents are not used since they often result in diminished quality of appearance of such molded articles [Seiichi Mima, Polymer Digest, 3, 39 (1984); etc.].

On the other hand, high refractive indices can be expected with polyurethane lenses made of the resin having S-alkyl thiocarbamate bonds. However, the resin adheres to a mold intimately upon molding, so that it is generally difficult to release it from the mold after polymerization. With this phenomenon in view, the present inventors have previously proposed a process in which an external releasing agent is used (Japanese Patent Laid-Open No. 267316/1987, etc.) or a process in which a polyolefin resin mold is used (Japanese Patent Laid-Open No. 236818/1987) to improve mold releasing properties in the preparation of lenses made of an S-alkyl thiocarbamate base resin formed by reacting a polyisocyanate and a mercapto compound.

However, these processes are still insufficient for improving the mold releasing property in casting polymerization of the S-alkyl thiocarbamate base lens of the present invention.

Specifically, in prior art processes in which external molding agents are used, a portion of the agent that is applied to the inner surface of a mold migrates to the surface or interior of the polymerized lens which results in irregularity or unevenness on the surface of the lens or turbidity within the lens. When the mold is used repeatedly, mold releasing treatment is required in each molding cycle, thus making the process complicated and decreasing productivity in producing the lens, rendering the process industrially unpractical. When the polyolefin resin mold is applied, the resin mold deforms at elevated temperatures which causes profile irregularities on the surface of the molded lens.

Thus, the lens is not useful in applications which require a high accuracy on the molded surface.

SUMMARY OF THE INVENTION

The present invention overcomes the problems and disadvantages of the prior art by providing an S-alkyl thiocarbamate base resin having improved properties over the prior art resins, a lens containing the resin having superior properties over prior art lenses and a process for producing the same.

It is an object of the present invention to provide an S-alkyl thiocarbamate base resin having a high refractive index, excellent weatherability and specific gravity and low dispersion of refractive index.

A further object of the invention is to provide an S-alkyl thiocarbamate base lens having high accuracy in the profile of surface and excellent optical properties and a process, for producing the same.

Additional objects and advantages of the invention will be set forth in part in the description which follows, and in part will be obvious from the description or may be learned by practice of the invention. The objects and advantages of the invention will be realized and attained by means of the instrumentalties and combinations, particularly pointed out in the appended claims.

To achieve the objects and in accordance with the purpose of the invention, as embodied and broadly described herein, the invention provides an S-thiocarbamate base resin and a process for producing the same comprising reacting one or more polyisocyanate compounds with one or more mercapto compounds containing at least one hydroxyl group.

The invention also provides a lens comprising the S-alkyl thiocarbamate base resin and a process for producing the same comprising adding internal mold releasing agents to a mixture of one or more polyisocyanate compounds and one or more hydroxyl containing mercapto compounds and then cast polymerizing the mixture to form a lens.

The S-alkyl thiocarbamate base resin produced by the process of the invention has a higher refractive index, causes less dispersion of refractive index, has excellent weatherability and specific gravity, is colorless and transparent and hence exhibits excellent optical characteristics over prior art resins. Moreover, these properties render the resin particularly suitable for use in making optical elements.

The S-alkyl thiocarbamate base lens produced by the process of the invention has superior profile regularity and optical characteristics over prior art plastic lenses. Further, the present process for producing the same can be carried out economically on an industrial scale.

DETAILED DESCRIPTION AND PREFERRED EMBODIMENT

Reference will now be made in detail to the present preferred embodiments of the invention.

A sulfur-containing polyisocyanate compound and-/or a mercapto compound containing at least two sulfur atoms, i.e. at least one sulfur atom in addition to the mercapto group, is preferably employed in the invention. Applicants have discovered that the use of such compounds in preparing the S-alkyl thiocarbamate resin and lens of the invention provides enhanced superior optical characteristics.

Exemplary polyisocyanate compounds that do not contain sulfur atoms that are suitable for use in the present invention include aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene- 1,4-diisocyanate, 2,4,4-trimethylhexamethylene diisocyanate, 1,6,11-undecatriisocyanate, 1,3,6-hexamethylene triisocyanate, 1,8-diisocyanate-4-(isocyanatomethyl)octane, 2,5,7-trimethyl-1,8-diisocyanate-5-(isocyanatomethyl)octane, bis(isocyanatoethyl)carbonate, bis(isocyanatoethyl)ether, 1,4-butyleneglycoldipropylether-$\omega$, $\omega'$-diisocyanate, lysinediisocyanate methyl ester, lysinetriisocyanate, 2-isocyanatoethyl-2,6-diisocyanatohexane, 2-isocyanatopropyl-2,6-diisocyanatohexane, xylylene diisocyanate, bis(isocyanatoethyl)benzene, bis(isocyanatopropyl)benzene, $\alpha$, $\alpha$, $\alpha'$, $\alpha'$-tetramethylxylylene diisocyanate, bis(isocyanatobutyl)benzene, bis(isocyanatomethyl)naphthalene, bis(isocyanatomethyl)-diphenyl ether, bis(isocyanatoethyl)phthalate, mesitylylene triisocyanate and 2,6-di(isocyanatomethyl)furan; alicyclic polyisocyanates such as isophorone diisocyanate, bis(isocyanatomathyl)cyclohexane, dicyclohexylmethane diisocyanate, cyclohexane diisocyanate, methylcyclohexane diisocyanate, dicyclohexyl dimethylmethane diisocyanate, 2,2'-dimethyldicyclohexylmethane diisocyanate, bis(4-isocyanato-n-butylidene)-pentaerythritol, dimeric acid diisocyanate, 2-isocyanatomethyl-3-(3-isocyanatopropyl)5-isocyanatomethyl-bicyclo[2,2,1]-heptane, 2-isocyanatomethyl-3-(3-isocyanatopropyl)-6-isocyanatomethyl-bicyclo-[2,2,1]-heptane, 2-isocyanatomethyl-2(3-isocyanatopropyl)-5(2-isocyanatoethyl)-bicyclo-[2,2,1]-heptane, 2-isocyanatomethyl-3-(3-isocyanatopropyl)-b 6-(2-cyanatoethyl)-bicyclo-[2,2,1]-heptane, 2isocyanatomethyl2-(3-isocyanatopropyl)-5-(2-isocyanatoethyl)-bicyclo[2,2,1]-heptane, and 2-isocyanatoethyl)-bicyclo-[2,2,1]-heptane; and aromatic polyisocyanates such as phenylene diisocyanate, tolylene diisoccyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, toluidine diisocyanate, 4,4'-diphenyl-methane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, (isocyanatomethyl)phenylisocyanate, (2-isocyanatoethyl)phenylisocyanate, tetrahydronaphthylene diisocyanate, hexahydrodiphenyl diisocyanate, hexahydrodiphenylmethane-4,4'-diisocyanate, diphenylether diisocyanate, ethyleneglycol-diphenylether diisocyanate, 1,3-propyleneglycol-diphenylether diisocyanate, benzophenone diisocyanate, diethyleneglycol-diphenylether diisocyanate, dibenzofuran diisocyanate, carbazole diisocyanate, ethylcarbazole diisocyanate and dichlorocarbazole diisocyanate.

Examplary sulfur-containing polyisocyanate compounds suitable for use in the invention include sulfur-containing aliphatic isocyanates such as thiodiethyl diisocyanate, thiodipropyl diisocyanate, thiodihexyl diisocyanate, dimethylsulfone diisocyanate, dithiodimethyl diisocyanate, dithiodiethyl diisocyanate and dithiodipropyl diisocyanate; aromatic sulfide-type isocyanates such as diphenylsulfide-2,4'-diisocyanate, diphenylsulfide-4,4'-diisocyanate, 3,3'-dimethoxy-4,4'-diisocyanatodibenzylthioether, bis(4-isocyanatomethylbenzene)sulfide and 4,4'-methoxybenzene-thioethyleneglycol-3,3'-diisocyanate; aromatic disulfide-type isocyanates such as diphenyl-disulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate; aromatic sulfone-type isocyanates such as diphenylsulfone-4,4'-diisocyanate, diphenylsulfone-3,3'-diisocyanate, benzidinsulfone-4,4'-diisocyanate, diphenylmethanesulfone-4,4'-diisocyanate, 4-methyldiphenylsulfone-2,4'-diisocyanate, 4,4'-dimethoxydiphenylsulfone-3,3'-diisocyanate, 3,3'-dimethoxy-4,4'-diisocyanato-dibenzylsulfone, 4,4'-dimethyldiphenylsulfone-3,3'-diisocyanate, 4,4'-ditert-butyldiphenylsulfone-3,3'-diisocyanate, 4,4'-methoxybenzene-ethylenedisulfone-3,3'-diisocyanate and 4,4'-dichlorodiphenylsulfone-3,3'-diisocyanate; sulfonic ester-type isocyanates such as 4-methyl-3isocyanato-benzenesulfonyl 4'-isocyanate phenol ester, 4-methoxy-3-isocyanatobenzenesulfonyl-4'-isocyanato-phenol ester; aromatic sulfonic amide such as 4-methyl-3-isocyanato-benzene-sulfonylaniide-3'-methyl-4'-isocyanate, dibenzenesulfonyl-ethylenediamine-4,4'-diisocyanate, 4,4'-methoxybenzenesulfonyl ethylenediamine-3,3'-diisocyanate, and 4-methyl-3-isocyanatobenzenesulfonylanilide-4-methyl-3'-isocyanate; sulfur-containing heterocyclic compounds such as thiophene-2,5-diisocyanate; and 1,4-dithian-2,5-diisocyanate.

Halogen-substituted polyisocyanate compounds such as chlorine-substituted and bromine-substituted, alkyl-substituted, alkoxy-substituted and nitro-substituted polyisocyanate compounds and prepolymer-type products modified with polyols, carbodiimide-modified products, urea-modified products, biuret-modified products and dimerization or trimerization products of these polyisocyanates are also suitable for use in the invention.

Polyisocyanate compounds that are liquid and have low vapor pressures at room temperature are preferred, in addition, from the standpoint of after-yellowing by heat and light, aliphatic polyisocyanates are more preferred. The polyisocyanate compounds may be used singly or as a mixture of at least two such compounds.

Exemplary suitable hydroxyl containing mercapto compounds that do not contain any sulfur atom in addition to the mercapto group for use in the invention include 2-mercaptoethanol, 3-mercapto-1,2-propanediol, glycerol-di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol-tris(3-mercaptopropionate), pentaerythritol-mono(3-mercaptopropionate), pentaerythritol-bis(3-mercaptoptopionate), pentaerythritol-tris(thioglycolate), and pentaerythritoltetrakis(3-mercaptopropionate).

Exemplary hydroxyl containing mercapto compounds that contain at least one sulfur atom in addition to the mercapto group suitable for use in the invention include hydroxymethyl-tris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide-mono(3-mercaptopropionate), dimercaptoethane-mono-(salicylate) and hydroxyethylthiomethyl-tris(-mercaptoethylthiomethyl)methane. Halogen-substituted compounds such as chlorinesubstituted and bromine-substituted mercapto compounds having hydroxyl groups may also be used. These compounds may be used singly or as a mixture of at least two such compounds.

The ratio of the polyisocyanate compound to the hydroxyl-containing mercapto compound is generally from about 0.5 to about 3.0, preferably from about 0.5 to about 1.5, in terms of the molar ratio of the functional groups NCO/(SH+OH).

The plastic lens of the invention comprises an S-alkyl thiocarbamate base resin. The resin contains principally S-alkyl thiocarbamate bonds and urethane bonds formed by the reaction of an isocyanate group with a mercapto group and a hydroxyl group. The resin may also contain allophanate bonds, urea bonds, biuret bonds, without having any negative effect on the properties of the lenses.

For example, when S-alkyl thiocarbamate bonds and urethane bonds are reacted with isocyanate groups, the cross-linking density increases and favorable results are often achieved. For such a reaction, the temperature should be raised to at least 100° C. and the amount of the isocyanate component should be increased. Further, an amine or the like may be used in combination to form urea bonds or biuret bonds. However, consideration must be given to the coloring of the resin and/or lens when the isocyanate compound is reacted with a compound in addition to the mercapto compound containing-hydroxyl groups.

The lens of the present invention is prepared by a casting polymerization process. A polyisocyanate compound and a hydroxyl containing mercapto compound are mixed. The mixture is deaerated by suitable means, if necessary, and then poured into a mold for polymerization.

A variety of agents such as a chain-extending agents, cross-linking agents, light stabilizers, ultraviolet absorbers, antioxidizing agents, oil soluble dyes and fillers may be added to the resin to achieve desired properties by methods known in the art.

A reaction catalyst may be employed in the process of the invention to control the reaction velocity at a desired rate. A catalyst known in the art to be suitable for use in producing polyurethane may be employed.

Applicants have found that incorporation of a an internal mold releasing agent into the mixture of polyisocyanate and mercapto compound prior to casting polymerization results in easier and better mold release of the polymerized lens. Thus, the resulting lens has no irregularity on the surface thereof, thus permitting a lens with a higher profile of regularity to be obtained.

The polymerization temperature and time depend on the kinds of the monomers and additives such as mold releasing agent. However, the polymerization generally is carried out in from about 0.5 to about 72 hours at a temperature of from about -50° C. to about 200° C., preferably at from room temperature to about 150° C., more preferably from about 50° C. to about 120° C.

Exemplary suitable internal mold releasing agents for use in the present invention include fluorine-containing nonionic surface active agents, silicon-containing nonionic surface active agents, quaternary alkylammonium salts, acidic phosphoric esters, liquid paraffin, waxes, higher fatty acids and metal salts thereof, higher fatty acid esters, higher fatty alcohols, bisamides, polysiloxanes, and aliphatic amine ethylene oxide additives. The internal mold releasing agents used in the present invention are selected in view of the combination of the monomers, polymerization conditions, economical efficiency, and ease of handling. These internal mold releasing agents may be used singly or as a mixture of two or more such compounds.

Exemplary suitable fluorine-containing nonionic surface active agents and silicon-containing nonionic surface active agents for use in the present invention include compounds containing perfluoroalkyl groups and dimethylpolysiloxane groups and hydroxyalkyl groups and phosphoric ester groups.

Examplary suitable fluorine containing nonionic surface active agents include Unidain DS-401 (product of Daikin Kogyo Co., Ltd.), Unidain DS-403 (product of Daikin Kogyo Co., Ltd.), F-Top EF122A (product of Shin Akita Chemical Co., Ltd.), F-Top EF126 (product of Shin Akita Chemical Co., Ltd.) and F-Top EF301 (product of Shin Akita Chemical Co., Ltd.). An exemplary suitable silicon containing nonionic surface active agent is Q2-120A, a trial product of the Dow Chemical Company.

Exemplary suitable quaternary alkylammonium salts for use in the present invention include cationic surface active agents such as halides, phosphates and sulfates of quaternary alkylammoniums, for example, trimethyloethylammonium chloride, trimethylstearylammonium chloride, trimethylethyloethylammonium chloride, triethyldodecylammonium chloride, trioctylmethylammonium chloride and diethylcyclohexyldodecylammonium chloride.

Exemplary suitable acidic phosphoric esters for use in the present invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecanol acid phosphate, and bis(tridecanol-acid) phosphate.

Exemplary suitable metal salts of higher fatty acids for use in the present invention include zinc salts, calcium salts, magnesium salts, nickel salts and copper salts of stearic acid, oleic acid, octanoic acid, lauric acid, behenic acid, recinoleic acid, zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, and copper palmitate.

Exemplary suitable higher fatty acid esters for use in the present invention include esters of higher fatty acids such as stearic acid, oleic acid, octanoic acid, lauric acid and ricinolic acid and alcohols such as ethylene glycol, dihydroxypropane, dihydroxybutane, neopentyl glycol and dihydroxyhexane.

The amount of the internal mold releasing agent used is generally from about 0.1 to about 10,000 ppm, preferably from about 1 to about 5,000 ppm based on the total weight of the polyisocyanate and the mercapto compound in terms of a single agent or a mixture of two or more of such agents. If used in an amount of less than 0.1 ppm, the resulting lens will be degraded in mold releasing ability. If used in an amount in excess of 10,000 ppm formation of haze in the resulting lenses, early release of the resulting lenses from a mold during polymerization, and deterioration of profile regularity on the surface of the resulting lenses will occur.

In the casting polymerization process in which the above-described internal mold releasing agents are used, additives and reaction catalysts useful in processes in which an internal mold releasing agent is not used can also be used. Annealing of the resultant polymerized lenses may be conducted if necessary.

The S-alkyl thiocarbamate base lenses thus obtained have high profile regularity and excellent optical characteristics, are lightweight and superb in impact resistance, and hence are suitable for optical elements such as eyeglass lenses and camera lenses.

The lens of the present invention may undergo physical or chemical treatment such as surface polishing treatment, antistatic treatment, hard coat treatment, antireflection coat treatment, coloring treatment and dimming treatment in order to improve or impart such properties as anti-reflection, high hardness, abrasion resistance, chemical resistance, fog resistance and fashionability, as required.

EXAMPLES

The present invention will be described in more detail by reference to the following Examples and Comparative Examples which are intended to be purely exemplary of the invention. Examples 1–12 illustrate the effectiveness of the resin of the present invention, while Examples 13–39 describe the effectiveness of the internal mold releasing agent according to the present invention in the preparation of lenses from the resin of the present invention. In the performance tests of the resultant lenses, refraction index and Abbe's number were measured in accordance with the following testing method. Refractive index and Abbe number: measured at 20° C. by means of a Pulfrich refractometer.

In Examples 1–12 and Comparative Examples 1–3, the resulting resins are tested for weatherability in the following manner.

Weatherability: A resin was laid on a Weatherometer equipped with a sunshine carbon arc lamp. After a lapse of 200 hours, the resin was taken out and its hue was compared with the hue of the resin prior to the test. The criterion of evaluation was as follows : no change — (O); slightly yellowing — ($\Delta$); and yellowing — (x).

EXAMPLE 1

After mixing 13.8 g (0.08 mole) of thiodiethyl diisocyanate and 16.0 g (0.04 mole) of pentaerythritoltris(3-mercaptopropionate), the resultant mixture was poured into a mold formed of a glass mold and a gasket. The mixture was raised in temperature slowly from room temperature to 120.C taking 48 hours whereby it was heated to complete the polymerization. The resinous lens thus-obtained was colorless and transparent, excellent in weatherability, and had a refractive index of $n^{20} = 1.58$ and an Abbe's number of $\nu^{20} = 42$.

EXAMPLES 2–12 AND COMPARATIVE EXAMPLES 1–13

Lenses were made in accordance with the compositions given in Table 1 in the same manner as in Example 1. The results of performance tests are shown in Table 1.

In Comparative Examples 1–3, conventional well-known resins were used. The resulting lenses did not have satisfactory refractive indexes and Abbe's numbers. In Comparative Example 3, the resulting lens was yellowed slightly.

TABLE 1

| | Polyisocyanate | | Mercapto compound | | Refractive index | Abbe's number | Weatherability | Appearance |
|---|---|---|---|---|---|---|---|---|
| Example-2 | (SCH$_2$CH$_2$NCO)$_2$ | 0.08 mol | CH$_2$CHCH$_2$<br>  \|  \|  \|<br>SH SH OH<br>HOCH$_2$CH$_2$SH | 0.04 mol<br><br><br>0.02 mol | 1.63 | 38 | O | Colorless transparent |
| Example-3 | (SCH$_2$CH$_2$CH$_2$NCO)$_2$ | 0.08 mol | CH$_2$OCOCH$_2$SH<br>\|<br>CHOH<br>CH$_2$OCOCH$_2$SH | <br><br><br>0.053 mol | 1.58 | 42 | O | Colorless transparent |
| Example-4 | S(CH$_2$CH$_2$NCO)$_2$ | 0.08 mol | C(CH$_2$SCH$_2$CH$_2$SH)$_3$<br>\|<br>CH$_2$SCH$_2$CH$_2$OH | 0.08 mol | 1.64 | 37 | O | Colorless transparent |
| Example-5 | (SCH$_2$CH$_2$NCO)$_2$ | 0.08 mol | C(CH$_2$SCH$_2$CH$_2$SH)$_3$<br>\|<br>CH$_2$SCH$_2$CH$_2$OH<br>HOCH$_2$CH$_2$SCH$_2$CH$_2$SH | 0.03 mol<br><br><br>0.02 mol | 1.66 | 35 | O | Colorless transparent |

TABLE 1-continued

| | Polyisocyanate | | Mercapto compound | | Refractive index | Abbe's number | Weather-ability | Appearance |
|---|---|---|---|---|---|---|---|---|
| Example-6 | CH$_2$NCO—C$_6$H$_4$—CH$_2$CNO | 0.08 mol | C(CH$_2$SCH$_2$CH$_2$SH)$_3$<br>CH$_2$SCH$_2$CH$_2$OH | 0.04 mol | 1.65 | 33 | O | Colorless transparent |
| Example-7 | CH$_2$NCO—C$_6$H$_4$—CH$_2$NCO | 0.08 mol | C(CH$_2$SCH$_2$CH$_2$SH)$_3$<br>CH$_2$SCH$_2$CH$_2$OH<br>HOCH$_2$CH$_2$SCH$_2$CH$_2$SH | 0.03 mol<br><br>0.02 mol | 1.64 | 34 | O | Colorless transparent |
| Example-8 | (CH$_2$CH$_2$CH$_2$NCO)$_2$ | 0.08 mol | C(CH$_2$SCH$_2$CH$_2$SH)$_3$<br>CH$_2$SCH$_2$CH$_2$OH | 0.04 mol | 1.60 | 41 | O | Colorless transparent |
| Example-9 | " | 0.08 mol | C(CH$_2$SCH$_2$CH$_2$SH)$_3$<br>CH$_2$SCH$_2$CH$_2$OH<br>HOCH$_2$CH$_2$SCH$_2$CH$_2$SH | 0.03 mol<br><br>0.02 mol | 1.59 | 42 | O | Colorless transparent |
| Example-10 | CH$_2$NCO—C$_6$H$_4$—CH$_2$NCO | 0.08 mol | C(CH$_2$OCOCH$_2$CH$_2$SH)$_3$<br>CH$_2$OH | 0.04 mol | 1.58 | 37 | O | Colorless transparent |
| Example-11 | (CH$_2$CH$_2$CH$_2$NCO)$_2$ | 0.08 mol | CH$_2$CHCH$_2$<br>| | |<br>SH SH OH<br>HOCH$_2$CH$_2$SH | 0.04 mol<br><br><br>0.02 mol | 1.53 | 47 | O | Colorless transparent |
| Example-12 | " | 0.08 mol | CH$_2$OCOCH$_2$SH<br>CHOH<br>CH$_2$OCOCH$_2$SH | 0.053 mol | 1.55 | 44 | O | Colorless transparent |
| Comp. Ex.-1 | " | 0.07 mol | HOCH$_2$CH$_2$CH$_2$CH$_2$OH | 0.07 mol | 1.50 | 55 | O | Colorless transparent |
| Comp. Ex.-2 | " | 0.05 mol | C$_6$H$_4$(SH)(SH)(SH) (benzene-1,2,3-trithiol) | 0.033 mol | 1.66 | 27 | O | Colorless transparent |
| Comp. Ex.-3 | CH$_2$NCO—C$_6$H$_4$—CH$_2$NCO | 0.05 mol | OH—C$_6$H(Br)$_2$—C(Me)$_2$—C$_6$H(Br)$_2$—OH | 0.05 mol | 1.61 | 27 | Δ | slightly yellowed transparent |

The following Examples 13–39 and Comparative Examples 4–19 illustrate the effectiveness of the internal mold releasing agents according to the present invention in the preparation of lenses made of the resins of the present invention. Mold releasing property is evaluated in accordance with the criterion described below. Particularly, the surface condition of the resulting lenses was observed by the human eye.

Mold releasing property: A Teflon-made wedge was driven in between a lens and a glass mold. Mold releasing property was evaluated as follows: released easily without any aresistance — (O); and not released wholly or even partially — (x).

EXAMPLE 13

After mixing 15.1 g (0.08 mol) of m-xylylene diisocyanate, 16.0 g (0.04 mol) of pentaerythritoltris(3-mercaptopropionate) and 0.003 g of Unidain DS-401 (internal mold releasing agent : product of Daikin Kogyo Co., Ltd.), the resulting mixture was poured into a mold composed of a glass mold and a gasket. The mixture was raised in a temperature gradually from 50.° C. to 120.° C. taking 48 hours whereby it was heated to complete the polymerization. After polymerization, a lens was released with ease. The lens thus-obtained was colorless and transparent and had a refractive index of n$^{20}$=1.58 and an Abbe's number of ν$^{20}$=37.

EXAMPLES 14–39

Lenses were made in accordance with the compositions given in Table 2 in the same manner as in Example 13. The results of performance tests are shown in Table 2.

COMPARATIVE EXAMPLES 4–19

Lenses were made in accordance with the compositions given in Table 3 in the same manner as in Example 13 except for the mold treatment shown in Table 3. The results are given in Table 3.

In Comparative examples 4–19, lenses were poorly released from molds due to the absence of any internal mold releasing agent, so that the lenses thus released had irregularities on their surfaces.

In Table 3, the description in the column "Mold treatment" signifies as follows:

(1) No treatment:

A glass mold was used in the absence of mold releasing agent.

(2) External mold-releasing treatment:

The inner surface of a glass mold was coated with an external mold releasing agent, YSR-6209 manufactured by Toshiba Silicone Co., and baked.

(3) External mold-releasing treatment-reuse: A glass mold was subjected to the external moldreleasing treatment and used for polymerization. Thereafter, it was used again for polymerization without any treatment.

(4) Use of PP-mold:

Polypropylene was injection-molded to form a mold, which was used in place of the glass mold.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

TABLE 2

| | Polyisocyanate | | Mercapto compound | | Internal mold releasing agent | | Releasing property | Appearance | Refractive index | Abbe's number |
|---|---|---|---|---|---|---|---|---|---|---|
| Example-14 | CH$_2$NCO<br>⌬<br>CH$_2$NCO | 0.08 mol | C(CH$_2$OCCH$_2$CH$_2$SH)$_3$<br>∥<br>CH$_2$OH O | 0.04 mol | Q2-120A (Dow) | 150 ppm | ○ | good profile regularity colorless & transparent | 1.58 | 37 |
| Example-15 | " | | " | | trimethylcetyl-ammonium chloride | 500 ppm | ○ | good profile regularity colorless & transparent | " | " |
| Example-16 | " | | " | | diisobutyl acid phosphate | 500 ppm | ○ | good profile regularity colorless & transparent | " | " |
| Example-17 | (CH$_2$CH$_2$CH$_2$NCO)$_2$ | 0.08 mol | CH$_2$—CH—CH$_2$<br>\|   \|   \|<br>SH  SH  OH<br>HOCH$_2$CH$_2$SH | 0.04 mol<br>0.02 mol | Unidain DS-403 (Daikin) | 100 ppm | ○ | good profile regularity colorless & transparent | 1.53 | 47 |
| Example-18 | " | | CH$_2$OCOCH$_2$SH<br>\|<br>CHOH<br>\|<br>CH$_2$OCOCH$_2$SH | 0.053 mol | Unidain DS-401 (Daikin)<br>Q2-120A (Dow) | 100 ppm<br>100 ppm | ○ | good profile regularity colorless & transparent | 1.55 | 44 |
| Example-19 | " | | C(CH$_2$SCH$_2$CH$_2$SH)$_3$<br>\|<br>CH$_2$SCH$_2$CH$_2$OH | 0.04 mol | dibutyl acid phosphate | 500 ppm | ○ | good profile regularity colorless & transparent | 1.60 | 41 |
| Example-20 | " | | C(CH$_2$SCH$_2$CH$_2$SH)$_3$<br>\|<br>CH$_2$SCH$_2$CH$_2$OH<br>HOCH$_2$CH$_2$SCH$_2$CH$_2$SH | 0.03 mol<br>0.02 mol | trimethyloctyl-ammonium chloride | 500 ppm | ○ | good profile regularity colorless & transparent | 1.59 | 42 |
| Example-21 | S(CH$_2$CH$_2$NCO)$_2$ | 0.08 mol | HOCH$_2$C(CH$_2$OCCH$_2$CH$_2$SH)$_3$<br>         ∥<br>         O | 0.04 mol | Unidain DS-401 (Daikin) | 100 ppm | ○ | good profile regularity colorless & transparent | 1.58 | 42 |
| Example-22 | " | | " | | Q2-120A (Dow) | 150 ppm | ○ | good profile regularity colorless & transparent | " | " |
| Example-23 | " | | " | | trimethylcetyl-ammonium chloride | 500 ppm | ○ | good profile regularity colorless & transparent | " | " |
| Example-24 | " | | " | | diisopropyl | 500 ppm | ○ | good profile | " | " |

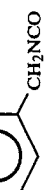

TABLE 2-continued

| | Polyisocyanate | | Mercapto compound | | Internal mold releasing agent | | Releasing property | Appearance | Refractive index | Abbe's number |
|---|---|---|---|---|---|---|---|---|---|---|
| Example-33 | (—SCH₂CH₂NCO)₂ CH₃-C₆H₃(NCO)(NCO) / NCO-C₆H₄-CH₂NCO | 0.04 mol 0.01 mol 0.07 mol | C(CH₂OCCH₂CH₂SH)₃ / CH₂OH (=O) | 0.04 mol | Q2-120A (Dow) | 150 ppm | O | good profile regularity colorless & transparent | 1.59 | 36 |
| Example-34 | OCN-C₆H₄-S-C₆H₄-NCO / S(CH₂CH₂NCO)₂ | 0.01 mol 0.09 mol | C(CH₂OCCH₂CH₂SH)₃ / CH₂OH (=O) | 0.05 mol | Unidain DS-401 (Daikin) | 100 ppm | O | good profile regularity colorless & transparent | 1.62 | 38 |
| Example-35 | OCN-C₆H₄-S-S-C₆H₄-NCO / S(CH₂CH₂NCO)₂ | 0.01 mol 0.09 mol | CH₂OCOCH₂SH / CNOH / CH₂OCOCH₂SH | 0.07 mol | dibutyl acid phosphate | 500 ppm | O | good profile regularity colorless & transparent | 1.64 | 37 |
| Example-36 | OCN-C₆H₄-SO₂-C₆H₄-NCO / C₆H₄(CH₂NCO)(CH₂NCO) | 0.01 mol 0.09 mol | C(CH₂SCH₂CH₂SH)₃ / CH₂SCH₂CH₂OH | 0.05 mol | dibutyl acid phosphate | 500 ppm | O | good profile regularity colorless & transparent | 1.65 | 34 |
| Example-37 | OCN-C₆H₄(Me)-SO₂-C₆H₄-NCO | 0.01 mol | CH₂SH / CH₂SH / CH₂OH | 0.06 mol | dibutyl acid phosphate | 500 ppm | O | good profile regularity colorless & transparent | 1.55 | 42 |

TABLE 2-continued

| | Polyisocyanate | | Mercapto compound | | Internal mold releasing agent | | Releasing property | Appearance | Refractive index | Abbe's number |
|---|---|---|---|---|---|---|---|---|---|---|
| Example-38 | (CH₂CH₂CH₂NCO)₂ [structure with Me, NCO, NS(=O)₂H groups] S(CH₂CH₂NCO)₂ | 0.08 mol 0.01 mol 0.09 mol | C(CH₂SCH₂CH₂SH)₃ — CH₂SCH₂CH₂OH | 0.05 mol | diisopropyl acid phosphate | 500 ppm | O | good profile regularity colorless & transparent | 1.65 | 34 |
| Example-39 | [thiophene structure with OCN, NCO] S(CH₂CH₂NCO)₂ | 0.02 mol 0.08 mol | C(CH₂OCCH₂CH₂SH)₃ — CH₂OH O | 0.05 mol | trimethylcetyl-ammonium chloride | 500 ppm | O | good profile regularity colorless & transparent | 1.60 | 38 |

TABLE 3

| | Polyisocyanate | | Mercapto compound | | Mold treatment | Releasing property | Appearance | Refractive index | Abbe's number |
|---|---|---|---|---|---|---|---|---|---|
| Comp. Ex.-4 | CH₂NCO–C₆H₄–CH₂NCO | 0.08 mol | C(CH₂OCCH₂CH₂SH)₃ ‖ O CH₂OH | 0.04 mol | no treatment | X | — | — | — |
| Comp. Ex.-5 | " | " | " | " | external mold releasing treatment | O | uneven surface colorless | 1.58 | 37 |
| Comp. Ex.-6 | " | " | " | " | external mold releasing treatment -reuse (Comp. Ex. 5) | X | — | — | — |
| Comp. Ex.-7 | " | " | " | " | use of PP-mold | O | poor profile regularity colorless | 1.58 | 37 |
| Comp. Ex.-8 | (CH₂CH₂CH₂NCO)₂ | 0.08 mol | CH₂—CH—CH₂ \| \| \| SH SH OH HOCH₂CH₂SH | 0.04 mol | no treatment | X | — | — | — |
| Comp. Ex.-9 | " | " | CH₂OCOCH₂SH \| CHOH \| CH₂OCOCH₂SH | 0.02 mol 0.053 mol | external mold releasing treatment | O | uneven surface colorless | 1.55 | 44 |
| Comp. Ex.-10 | " | " | C(CH₂SCH₂CH₂SH)₃ \| CH₂SCH₂CH₂OH | 0.04 mol | external mold releasing treatment -reuse (Comp. Ex. 9) | X | — | — | — |
| Comp. Ex.-11 | (CH₂CH₂CH₂NCO)₂ | 0.08 mol | C(CH₂SCH₂CH₂SH)₃ \| CH₂SCH₂CH₂OH HOCH₂CH₂SCH₂CH₂SH | 0.03 mol 0.02 mol | use of PP-mold | O | poor profile regularity colorless | 1.59 | 42 |
| Comp. Ex.-12 | S(CH₂CH₂NCO)₂ | 0.08 mol | HOCH₂C(CH₂OCCH₂CH₂SH)₃ ‖ O | 0.04 mol | no treatment | X | — | — | — |
| Comp. Ex.-13 | " | " | " | " | external mold releasing treatment | O | uneven surface colorless | 1.58 | 42 |
| Comp. Ex.-14 | " | " | " | " | external mold releasing treatment -reuse (Comp. Ex. 13) | X | — | — | — |
| Comp. Ex.-15 | " | " | " | " | use of PP-mold | O | poor profile regularity | 1.58 | 42 |

TABLE 3-continued

| | Polyisocyanate | Mercapto compound | | Mold treatment | Releasing property | Appearance | Refractive index | Abbe's number |
|---|---|---|---|---|---|---|---|---|
| Comp. Ex.-16 | —(SCH$_2$CH$_2$NCO)$_2$ 0.08 mol | CH$_2$—CH—CH$_2$<br>\|   \|   \|<br>SH  SH  OH<br>HOCH$_2$CH$_2$SH | 0.04 mol<br><br>0.02 mol | no treatment | X | colorless | — | — |
| Comp. Ex.-17 | (—SCH$_2$CH$_2$CH$_2$—NCO)$_2$ 0.08 mol | CH$_2$OCOCH$_2$SH<br>\|<br>CHOH<br>\|<br>CH$_2$OCOCH$_2$SH | 0.053 mol | external mold releasing treatment | O | uneven surface colorless | 1.58 | 42 |
| Comp. Ex.-18 | S(CH$_2$CH$_2$NCO)$_2$ 0.08 mol | C(CH$_2$SCH$_2$CH$_2$SH)$_3$<br>CH$_2$SCH$_2$CH$_2$OH | 0.04 mol | external mold releasing treatment -reuse (Comp. Ex. 17) | X | — | — | — |
| Comp. Ex.-19 | S(CH$_2$CH$_2$NCO)$_2$ 0.08 mol | C(CH$_2$SCH$_2$CH$_2$SH)$_3$<br>CH$_2$SCH$_2$CH$_2$OH<br>HOCH$_2$CH$_2$SCH$_2$CH$_2$SH | 0.03 mol<br><br>0.02 mol | use of PP-mold | O | poor profile regularity colorless | 1.66 | 35 |

What is claimed is:

1. A process for producing an S-alkyl thiocarbamate base resin comprising reacting at least one polyisocyanate compound with at least one hydroxyl containing mercapto compound wherein the mole ratio of said polyisocyanate compound to said hydroxyl containing mercapto compound is from about 0.5 to about 3.0 moles of functional isocyanate groups per mole of functional (SH +OH) group, except for the combination of polyisocyanate compounds having no sulfur atoms and hydroxyl-containing-mercapto compounds having no sulfur atoms other than the mercapto group.

2. A process for producing an S-alkyl thiocarbamate base lens comprising adding an internal mold releasing agent to a mixture of at least one polyisocyanate compound and at least one hydroxyl containing mercapto compound, and then cast polymerizing the same wherein the mole ratio of said polyisocyanate compound to said hydroxyl containing mercapto compound is from about 0.5 to about 3.0 moles of functional isocyanate groups per mole of functional SH +OH) group.

3. An S-alkyl thiocarbamate base lens produced by the process of claim 2.

4. The S-alkyl thiocarbamate base resin of claim 1 wherein the polyisocyanate compounds are sulfur-containing polyisocyanate compounds.

5. The process of claim 2 wherein the polyisocyanate compounds are sulfur-containing polyisocyanate compounds.

6. The S-alkyl thiocarbamate base lens of claim 3 wherein the polyisocyanate compounds are sulfur-containing polyisocyanate compounds.

7. The S-alkyl thiocarbamate base resin of claim 1 wherein the hydroxyl containing mercapto compounds contain at least one sulfur atom in addition to the mercapto group.

8. The process of claim 2 wherein the hydroxyl containing mercapto compounds contain at least one sulfur atom in addition to the mercapto group.

9. The S-alkyl thiocarbamate base lens of claim 3 wherein the hydroxyl containing mercapto compounds contain at least one sulfur atom in addition to the mercapto group.

10. The process of claim 2 wherein the internal mold releasing agent is a fluorine containing nonionic surface active agent.

11. The process of claim 2 wherein the internal mold releasing agent is a silicon containing nonionic surface active agent.

12. The process of claim 2 wherein the internal mold releasing agent is an alkyl quaternary ammonium salt.

13. The process of claim 2 wherein the internal mold releasing agent is an acid phosphate ester.

14. The S-alkyl thiocarbamate base lens of claim 3 wherein the internal mold releasing agent is a fluorine containing nonionic surface active agent.

15. The S-alkyl thiocarbamate base lens of claim 3 wherein the internal mold releasing agent is a silicon containing nonionic surface active agent.

16. The S-alkyl thiocarbamate base lens of claim 3 wherein the internal mold releasing agent is an alkyl quaternary ammonium salt.

17. The S-alkyl thiocarbamate base lens of claim 3 wherein the internal mold releasing agent is an acid phosphate ester.

18. The process of claim 2 wherein the internal mold releasing agent is present in an amount of from about 0.1 to about 10,000 ppm per sum of the polyisocyanate and the hydroxyl containing mercapto compound.

19. The S-alkyl thiocarbamate base lens of claim 3 wherein the internal mold releasing agent is present in an amount of from about 0.1 to about 10,000 ppm per sum of the polyisocyanate and the hydroxyl containing mercapto compound.

20. The process of claim 2 wherein casting polymerization is carried out at a temperature of from about $-50°$ C. to about 200° C.

21. An S-alkyl thiocarbamate base resin prepared by the process of claim 1.

22. An S-alkyl thiocarbamate base lens comprising an S-alkyl thiocarbamate base resin of claim 21.

23. The S-alkyl thiocarbamate base lens of claim 22 wherein the polyisocyanate compounds are sulfur-containing polyisocyanate compounds.

24. The S-alkyl thiocarbamate base lens of claim 22 wherein the hydroxyl containing mercapto compounds contain at least one sulfur atom in addition to the mercapto group.

* * * * *